United States Patent [19] [11] 4,239,996
Bhada et al. [45] Dec. 16, 1980

[54] POTASSIUM CARBONATE RECOVERY

[75] Inventors: Rohinton K. Bhada, Homeworth; Howard B. Lange, Jr.; Stephen S. Strom, both of Alliance, all of Ohio

[73] Assignee: The Babcock & Wilcox Company, New Orleans, La.

[21] Appl. No.: 582,066

[22] Filed: May 29, 1975

[51] Int. Cl.² ............ H02K 45/00; C01B 17/02; C01D 7/00
[52] U.S. Cl. ............ 310/11; 423/574 L; 423/244; 423/186; 423/563; 423/428
[58] Field of Search ............ 310/11, DIG. 3; 423/186, 189, 193, 200, 208, 427, 428, 561, 563, 152, 244, DIG. 3, 574

[56] References Cited

U.S. PATENT DOCUMENTS

| 1,979,151 | 10/1934 | Fricke et al. | 423/428 |
| 2,993,753 | 7/1961 | Collins, Jr. | 423/182 |
| 3,020,195 | 2/1962 | Casciani et al. | 423/183 |
| 3,026,240 | 3/1962 | Matty | 423/209 |
| 3,127,237 | 3/1964 | Markant | 423/428 |
| 3,153,609 | 10/1964 | Markant et al. | 423/182 |
| 3,210,235 | 10/1965 | Ferrigan, Jr. et al. | 423/183 |
| 3,379,903 | 4/1968 | Rosner | 310/11 |
| 3,401,010 | 9/1968 | Guerrieri | 423/428 |
| 3,508,863 | 4/1970 | Kiminki et al. | 423/189 |
| 3,873,860 | 3/1975 | Bergman et al. | 310/11 |

Primary Examiner—Delbert E. Gantz
Assistant Examiner—Gary P. Straub
Attorney, Agent, or Firm—Robert J. Edwards; John L. LaPierre

[57] ABSTRACT

A process for reacting potassium carbonate with the sulfur in an MHD gas to form potassium sulfate and for recovering the potassium carbonate for recycle as a seeding material for the MHD gas.

3 Claims, 2 Drawing Figures

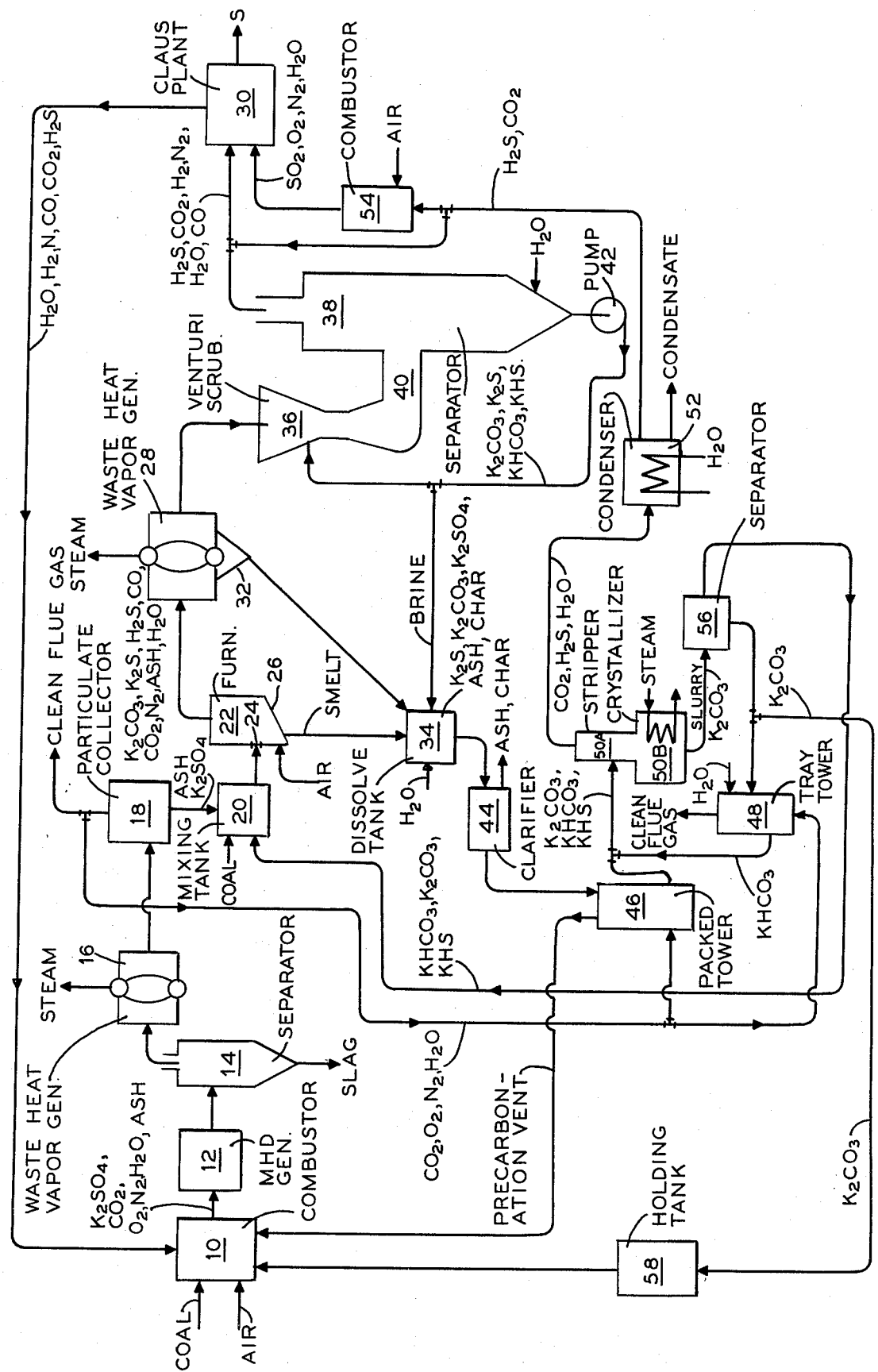

POTASSIUM CARBONATE RECOVERY

BACKGROUND OF THE INVENTION

The present invention relates to the use of potassium carbonate as the ionizing and clean-up agent of a sulfur-laden working gas for a magnetohydrodynamic electric generator wherein the potassium carbonate reacts with the sulfur to form potassium sulfate and more particularly to a thermochemical process for recovering the potassium carbonate from the potassium sulfate.

The theory of magnetohydrodynamic (MHD) electric power generation has been known for many years, and potential for practical application of the MHD principle became a reality when it was discovered that required gas conductivity could be obtained in combustion gases at temperature as low as 3500° F. with the use of a seeding material such as potassium carbonate. However, notwithstanding the solution of the gas conductivity problem the MHD generator continued to be economically unattractive as a result of costs arising out of the need for the replacement of seeding material and the clean-up of MHD exhaust gas to satisfy present day pollution criteria.

SUMMARY OF THE INVENTION

The invention provides a process wherein the MHD gas is cleaned through the removal of sulfur and the potassium carbonate is recovered for use as a seeding material.

Accordingly, there is provided a process whereby potassium carbonate is admitted to an MHD combustor and combined with the sulfur-laden fuel or combustion gas to react with the sulfur and form potassium sulfate and to induce ionization of the gas preparatory to its use as the working fluid in an MHD generator. Recovery of the potassium carbonate is achieved by removing potassium sulfate crystals from the MHD exhaust gas and firing the potassium sulfate in the presence of carbon and under reducing conditions to obtain a molten smelt including potassium sulfide and a gas including potassium salts, the latter are recovered from the gas and are mixed with the smelt and water to form a solution including potassium sulfide and potassium carbonate. The solution is contacted with carbon dioxide in sufficient amount to form a precarbonated solution including potassium carbonate and potassium bisulfide. A slurry including potassium bicarbonate is added to the precarbonated solution to form a mixture including potassium bicarbonate and potassium hydrosulfide. Heat is applied to the mixture to produce a vapor including hydrogen sulfide and a slurry including potassium carbonate crystals, and the slurry is separated into potassium carbonate crystals and a saturated solution including potassium salts.

BRIEF DESCRIPTION OF THE DRAWING

The drawing is a schematic representation of a system embodying the invention as related to a process for recovering potassium carbonate after its having been used as the ionizing and clean-up agent of a sulfur-laden working fluid for an MHD electric generator.

DESCRIPTION OF THE PREFERRED EMBODIMENT

In the drawing there is illustrated a combustor 10 of the type including a cyclone combustion chamber of the character disclosed in U.S. Pat. No. 3,179,074. Preheated air and carbonaceous fuel, preferably coal, are fired in the combustor 10 to produce a high temperature gas, and potassium carbonate crystals are added to the combustor 10 either by mixing with the fuel or introduction into the combustion gas. The quantity of potassium carbonate added to the combustor 10 is controlled to achieve the desired level of gas ionization and to react with the sulfur in the fuel to form potassium sulfate.

The high temperature gas including potassium sulfate, carbon dioxide, oxygen, nitrogen and ash and discharging from the combustor 10 is conveyed to a magnetohydrodynamic (MHD) electric generator 12 of the character disclosed in U.S. Pat. No. 3,328,612. The gas leaving the MHD generator 12 is tangentially introduced into a centrifugal type separator 14 for the removal of slag and is thereafter conveyed to a waste heat type vapor generator 16 of the character disclosed in U.S. Pat. No. 2,754,807 wherein the heat of the gas is used to generate steam thereby reducing the gas temperature from about 2800° F. to approximately 300° F. The cooled gas is thence conveyed to a collector 18 for the removal of potassium sulfate crystals and residual ash particulates. The collector 18 may be in the form of an electrostatic precipitator. The gas discharged from the collector 18 includes carbon dioxide, nitrogen and water vapor and is sufficiently clean to satisfy present day requirements for emission to atmosphere.

The potassium sulfate crystals and residual ash particulates recovered by the collector 18 are conveyed to a mixing tank 20 to be combined with carbonaceous fuel, preferably coal, and a solution including potassium salts to form a liquid of a consistency suitable for spraying into a smelter type furnace 22 of the character disclosed in U.S. Pat. No. 2,879,838. The carbonaceous fuel added to the mixing tank 20 is in sufficient quantity to provide the carbon necessary to sustain a thermal reduction process within the furnace 22. The discharge from the mixing tank 20 is conveyed to a nozzle 24 which sprays the mixture into furnace 22 wherein it is incinerated under a reducing atmosphere to form a smelt on the furnace hearth 26 including potassium sulfide, potassium carbonate, potassium sulfate and residuals of char and coal ash. Auxiliary fuel burners may be provided for furnace 22 to maintain the smelt bed temperature in excess of the 1800° F. required to insure substantial reduction of potassium sulfate to potassium sulfide. The total combustion air supplied to the furnace 22 is maintained in the range of 60 to 90 percent of stoichiometric air with 40 to 60 percent of the air being admitted around the smelt bed to support the reduction process and the remaining air being introduced above the bed to achieve partial combustion of the high temperature gas produced by the incineration process.

The gas leaving the furnace 22 includes potassium carbonate and potassium sulfide fume, hydrogen sulfide, carbon monoxide, carbon dioxide, nitrogen, water vapor and ash is conveyed to a waste heat vapor generator 28 wherein the heat of the gas generates steam and the gas temperature is reduced from about 2000° to approximately 300° F. The vapor generator 28 is provided with a hopper 32 to collect potassium salts and ash which have adhered to internal surfaces. These particulates are removed during periodic cleaning of the surfaces and are passed from the hopper 32 to a dissolving tank 34.

The cooled gas discharged by the vapor generator 28 is conveyed to a venturi type scrubber 36 of the character disclosed in U.S. Pat. No. 3,284,064. The gas is contacted by a liquid spray in the throat of venturi scrubber 36 and is thereafter conveyed to a centrifugal separator 38 situated immediately downstream flow-wise of the venturi scrubber 36 and connected thereto by a duct 40. The liquid-laden gas is tangentially introduced into the separator 38 wherein solid and liquid particulate matter is centrifugally separated from the gas. Water is added to the separator 38 to form a brine including potassium carbonate, potassium bicarbonate, potassium sulfide and potassium bisulfide. A pump 42 removes the brine from separator 38 and a portion of the brine is recirculated to form the liquid spray for venturi scrubber 36 and the remainder is passed to the dissolving tank 34. The gas leaving the separator 38 includes hydrogen sulfide, carbon dioxide, hydrogen, nitrogen, carbon monoxide and water vapor and is conveyed to a Claus plant 30.

The smelt in furnace 22 discharges to the dissolving tank 34 wherein it is combined with water and brine and reacts therewith to form a solution including potassium sulfide, potassium carbonate, potassium sulfate, ash and char. The solution is then passed through a clarifier 44 for the removal of ash and char. The clarified solution is thence conveyed to a packed tower 46 wherein it is contacted by a portion of the gas discharged by the collector 18. The gas from collector 18 contains carbon dioxide in sufficient quantity to precarbonate the solution by converting the potassium sulfide to potassium bisulfide and potassium carbonate as follows:

$$2K_2S + CO_2 + H_2O \rightarrow 2KHS + K_2CO_3$$

The gas produced by the precarbonation reaction occurring in the packed tower 46 is vented to the combustor 10 for mixing with the combustion gas.

A portion of the gas discharged by the collector 18 is conveyed to a tray tower 48. Water is separately added to the tower 48. The carbon dioxide in the gas is contacted with crystallized potassium carbonate and water, and reacts therewith to produce a potassium bicarbonate slurry as follows:

$$CO_2 + K_2CO_3 + H_2O \rightarrow 2KHCO_3$$

The gas produced by the above reaction is sufficiently clean to satisfy present day requirements for emission to atmosphere.

The bicarbonate slurry is combined with the precarbonated solution discharged by the packed tower 46 and forms a mixture including potassium carbonate, potassium bicarbonate and potassium bisulfide which is passed to the stripper 50A of a stripper-crystallizer unit where the following reaction occurs:

$$KHS + KHCO_3 \rightarrow K_2CO_3 + H_2S$$

The stripper 50A is in the form of a tray column and occupies the upper portion of the unit while the crystallizer 50B is in the form of a heat exchanger which occupies the lower portion of the unit. The potassium bicarbonate and potassium bisulfide mixture is introduced at the top of the stripper 50A and gravitates to the crystallizer 50B. Steam is admitted to the crystallizer 50B and through indirect heat exchange results in evaporation of part of the mixture. This evaporation caused the potassium carbonate to precipitate out in crystallized form. The vapor produced in the crystallizer 50B moves upwardly through the stripper 50A and strips the hydrogen sulfide gas from the gravitating mixture.

The gas leaving the stripper 50A includes hydrogen sulfide, water vapor and traces of carbon dioxide and is conveyed to a condenser 52 wherein indirect heat exchange with a coolant e.g., water, removes the water vapor from the gas as condensate. A portion of the gas discharging from the condenser 52 is combined with the gas flowing from the separator 38 to the Claus plant 30. The remainder of the gas discharging from condenser 52 is introduced into a combustor 54 and fired in the presence of air to produce a gas including sulfur dioxide, oxygen, nitrogen and water vapor which is thence conveyed to the Claus plant 30. The gas leaving the combustor 54 contains about one third of the sulfur entering the Claus plant 30 and reacts therein with hydrogen sulfide to produce sulfur in the following reaction:

$$2H_2S + SO_2 \rightarrow 3S + 2H_2O$$

The gas produced in the Claus plant 30 includes carbon dioxide, carbon monoxide, hydrogen, nitrogen, water vapor and low levels of hydrogen sulfide and is conveyed to the combustor 10 for mixing with the combustion gas.

The slurry discharged by the crystallizer 50B is conveyed to a separator 56 for the recovery of potassium carbonate crystals. The slurry leaving the separator 56 is recycled to the mixing tank 20 to combine with coal and potassium sulfate and form the mixture being injected into the smelter type furnace 22.

A portion of the potassium carbonate crystals recovered by the separator 56 are recycled to the tray tower 48 to react with carbon dioxide gas and produce potassium bicarbonate slurry which will then be combined with the precarbonated solution and form the mixture that is passed to the stripper 50A. The remaining potassium carbonate crystals recovered by the separator 56 are conveyed to a holding tank 58 and are fed therefrom at a controlled rate to the combustor 10 where they can either be combined with the fuel or the combustion gas to induce ionization of the gas and to react with the sulfur to form potassium sulfate.

While in accordance with provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

The embodiments of the invention in which an exclusive property or privilege is claimed are defined as follows:

1. In the production of electricity in an MHD generator including firing a sulfur-containing fuel in the presence of air and potassium carbonate to produce a high temperature seeded gas, passing the seeded gas through the generator to produce electricity and wherein the potassium carbonate seed reacts with the sulfur to form potassium sulfate, cooling the generator discharge gas through indirect heat exchange, recovering the potassium sulfate from the cooled gas, and converting the potassium sulfate to potassium carbonate crystals and a saturated solution including potassium salts, the improvement comprising the steps of:

a. mixing coal and the saturated solution including potassium salts with said potassium sulfate,
b. firing said mixture in the presence of 60 to 90 percent of stoichiometric air to produce a molten smelt including potassium sulfide and a gas including potassium salts under reducing conditions,
c. cooling the potassium salts-containing gas through indirect heat exchange,
d. passing said last named gas through a liquid spray contact zone to recover substantially all of the potassium salts therefrom,
e. adding water and said recovered potassium salts to the smelt to form a solution including potassium sulfide and potassium carbonate,
f. clarifying said last named solution,
g. contacting said last named solution with a gas including carbon dioxide in sufficient amount to form a precarbonated solution including potassium carbonate and potassium bisulfide,
h. adding a slurry including potassium bicarbonate to the precarbonated solution to form a mixture including potassium bicarbonate and potassium bisulfide,
i. heating the mixture to produce a gas including hydrogen sulfide and a slurry including potassium carbonate crystals,
j. firing at least some of said hydrogen sulfide-containing gas in the presence of air to produce a gas including sulfur dioxide,
k. mixing the remainder of said hydrogen sulfide-containing gas with the gas discharged from said spray contact zone,
l. reacting the gas mixture with said sulfur dioxide to form sulfur,
m. recovering the potassium carbonate crystals from the last named slurry by separating out said saturated solution including potassium salts,
n. recycling the saturated solution including potassium salts for mixing with the potassium sulfate and coal, and
o. recycling the potassium carbonate crystals for use as seeding material for said MHD generator.

2. The method according to claim 1 wherein the recycling of potassium carbonate crystals includes mixing said crystals with the fuel preparatory to firing.

3. The method according to claim 1 wherein the potassium salts-containing gas in step c is cooled to approximately 300° F.

* * * * *